United States Patent
Kosinski et al.

(10) Patent No.: US 6,203,901 B1
(45) Date of Patent: Mar. 20, 2001

(54) POLYURETHANE FIBERS AND FILMS

(75) Inventors: Leonard Edward Raymond Kosinski, Chadds Ford, PA (US); Govindasamy Paramasivam Rajendran, Newark, DE (US); Robert Rex Reitz, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/202,577

(22) PCT Filed: Jun. 23, 1997

(86) PCT No.: PCT/US97/10887

§ 371 Date: Dec. 17, 1998

§ 102(e) Date: Dec. 17, 1998

(87) PCT Pub. No.: WO97/49847

PCT Pub. Date: Dec. 31, 1997

Related U.S. Application Data
(60) Provisional application No. 60/020,298, filed on Jun. 24, 1996.

(51) Int. Cl.⁷ .................. D01F 6/00; D01F 6/72
(52) U.S. Cl. ........................................ 428/364; 428/372
(58) Field of Search ........................ 428/372, 364

(56) References Cited

U.S. PATENT DOCUMENTS

| | | | |
|---|---|---|---|
| 3,567,680 | 3/1971 | Iannicelli | 260/41.5 |
| 3,594,111 | 7/1971 | Wittcoff et al. | 8/4 |
| 3,728,301 | 4/1973 | Spence et al. | 260/33.6 R |
| 4,810,578 | 3/1989 | Prescott et al. | 428/405 |
| 5,102,948 | 4/1992 | Deguchi et al. | 524/789 |
| 5,106,420 | 4/1992 | Marshall, Jr. | 106/499 |
| 5,106,421 | 4/1992 | Marshall, Jr. et al. | 406/499 |
| 5,164,460 | 11/1992 | Yano et al. | 524/445 |
| 5,198,410 | 3/1993 | Martin | 503/227 |
| 5,296,284 | 3/1994 | Durham | 428/207 |
| 5,302,437 | 4/1994 | Idei et al. | 428/195 |
| 5,320,672 | 6/1994 | Whalen-Shaw | 106/287.24 |
| 5,376,604 | 12/1994 | Iwasaki et al. | 501/146 |
| 5,421,876 | 6/1995 | Janoski | 106/278 |
| 5,462,910 | 10/1995 | Ito et al. | 503/227 |
| 5,690,922 | * 11/1997 | Mouri et al. | 424/76.1 |
| 5,747,560 | * 5/1998 | Christiani et al. | 523/209 |
| 5,928,785 | * 7/1999 | Nishida et al. | 428/372 |
| 5,972,049 | * 10/1999 | Wicker, Jr. et al. | 8/574 |
| 5,983,434 | * 11/1999 | Eichinger et al. | 15/180 |

FOREIGN PATENT DOCUMENTS

| | | | |
|---|---|---|---|
| 0 619 182 A1 | 10/1994 | (EP) | B32B/27/12 |
| 08 041315 | 2/1996 | (JP) | C08L/75/04 |
| WO 93/04117 | 3/1993 | (WO) | C08K/3/34 |
| WO 93/04118 | 3/1993 | (WO) | C08K/9/04 |
| WO 93/11190 | 6/1993 | (WO) | C08K/7/00 |
| WO 94/29499 | 12/1994 | (WO) | D01F/6/70 |
| WO 97/09473 | 3/1997 | (WO) | D01F/6/70 |

* cited by examiner

*Primary Examiner*—Newton Edwards (57) ABSTRACT

This invention provides a fiber comprising a polyurethaneurea and layers delaminated from a lamellar clay, said layers being dispersed in said polyurethaneurea.

12 Claims, 1 Drawing Sheet

POLYURETHANE FIBERS AND FILMS

This application claims the benefit of Provisional Application No. 60/020,298 filed Jun. 24, 1996.

FIELD OF THE INVENTION

This invention relates to polyurethane fibers and films. More particularly, the invention concerns an improvement in such fibers and films wherein a lamellar clay is incorporated into the polyurethane. Results of the improvement are significantly decreased tack in such fibers and films and a significantly increased ability to provide dyed fibers and film.

TECHNICAL BACKGROUND

Elastomeric fibers, such as those made from polyurethane, are suitable for fibers and fabrics due to their outstanding stretch and recovery properties. However, certain polyurethane filaments are very tacky compared to conventional textile filaments, such as those melt-spun from nylon or polyester polymers. These polyurethane filaments tend to stick to each other, especially when wound on a pirn, bobbin, cake or other such yarn package. Tackiness can manifest itself in fused filament segments and high yarn-to-yarn friction. Also, on being unwound from a yarn package, the polyurethane filaments can experience excessive tension and large, rapid transient increases in tension, which in turn lead to many broken filaments during operations such as covering, knitting, weaving and the like. Further, because the polyurethane filaments are subjected to higher compressive forces when they are located in the inner layers of a wound up yarn package, as compared to the compressive forces on the filaments in the outer layers, average tension and numbers of tension transients can change significantly as the filaments are unwound from the yarn package. Such tension variations produce nonuniformities in fabrics made with fibers produced from polyurethane supplied from such packages. Tack between fibers is known to increase with aging on the package form. In addition to time, higher than ambient storage temperatures can accelerate the increase in tack thus limiting the ability to remove fiber from the package in knitting or other fabric forming processes. Thus agents that slow this increasing tack are desired for extended usefulness of fiber stored on the package. Polyurethane films can also exhibit similar problems as the result of tackiness.

To reduce tackiness certain additives have been introduced into polyurethane fiber, such as spandex. These additives include silicon oil and metal stearates. In addition, various finishes have been suggested for lubricating the surfaces of the fiber and thus reducing the tackiness of spandex. However, further improvements are desired.

In addition to the tack problem, certain polyurethane filaments are not easily dyeable as compared to conventional textile filaments, such as those melt-spun from nylon or polyester. Other polyurethane filaments may accept dye, but the dye tends to wash out readily. Spandex is often covered or blended with other fibers such as those made from polyamide, i.e. nylon, and polyester. However, when such fibers and fabrics are stretched, the undyed or slightly stained spandex shows through the colored fiber covering. This is referred to as "grin through".

In addition, the spandex reflects visible light causing a glitter effect. Both "grin through" and glitter are objectionable in most dyed fabrics. Polyurethane film can also be difficult to dye.

An object of the present invention is to provide improved polyurethane fibers, and fabrics made therefrom, and films that possess reduced tack and processes for providing such fibers. Another object of the present invention is to provide improved polyurethane fibers, fabrics, and films that permit enhanced dyeability and washfastness. A further object of the present invention is to provide processes which increase the ability to provide dyed fiber and films. These improvements will permit more efficient utilization of the fiber in yarn and fabric making operations and the film in other applications, such as coatings, while retaining other desirable elastomeric properties.

SUMMARY OF THE INVENTION

The present invention provides a fiber, comprising: a wet- or dry-spun product which comprises a polyurethane and layers delaminated from a lamellar clay, said layers being dispersed in said polyurethane.

The present invention also provides a process for preparing a fiber comprising a wet- or dry-spun product which comprises a polyurethane and layers delaminated from a lamellar clay, said layers being dispersed in said polyurethane, the process comprising the steps of:

(a) contacting a solution comprising a polyurethane and an aprotic polar solvent with a lamellar clay, or with a dispersion of said lamellar clay in the aprotic polar solvent, to form a polyurethane/clay dispersion;

(b) agitating the polyurethane/clay dispersion sufficient to delaminate all or a portion of said layers from the lamellar clay and from each other; and (c) wet- or dry-spinning the polyurethane/clay dispersion to form a fiber.

The present invention also provides a process for preparing a dyed fiber comprising a wet- or dry-spun product which comprises a polyurethane, layers delaminated from a lamellar clay, and a dye, said layers and said dye being dispersed in said polyurethane, the process comprising the steps of:

(a) contacting a clay dispersion comprising a lamellar clay and a solvent with a dye solution comprising an organic dye to form a first dye/clay dispersion;

(b) recovering a dyed clay from the first dye/clay dispersion;

(c) contacting a solution comprising a polyurethane and an aprotic polar solvent with a second dye/clay dispersion comprising the dyed clay and the aprotic polar solvent to form a dye/clay/polyurethane dispersion;

(d) agitating the dye/clay/polyurethane dispersion sufficient to delaminate all or a portion of said layers from the lamellar clay and from each other; and (e) wet- or dry-spinning the dye/clay/polyurethane dispersion to form a dyed fiber.

The present invention further provides a film, comprising: a solution cast product which comprises a polyurethane and layers delaminated from a lamellar clay, said layers being dispersed in said polyurethane.

The present invention also provides a process for preparing a film which comprises a polyurethane and layers delaminated from a lamellar clay, said layers being dispersed in said polyurethane, the process comprising the steps of:

(a) contacting a solution comprising a polyurethane and an aprotic polar solvent with a lamellar clay, or with a dispersion of said lamellar clay in the aprotic polar solvent, to form a polyurethane/clay dispersion;

(b) agitating the polyurethane/clay dispersion sufficient to delaminate all or a portion of said layers from the lamellar clay and from each other; and (c) casting and drying the polyurethane/clay dispersion to form a film.

The present invention further provides a process for preparing a dyed film comprising a polyurethane, layers delaminated from a lamellar clay, and a dye, said layers and said dye being dispersed in said polyurethane, the process comprising the steps of contacting a clay dispersion comprising a lamellar clay and a solvent with a dye solution comprising an organic dye to form a first dye/clay dispersion; recovering a dyed clay from the first dye/clay dispersion; contacting a solution comprising a polyurethane and an aprotic polar solvent with a second dye/clay dispersion comprising the dyed clay and the aprotic polar solvent to form a dye/clay/polyurethane dispersion; agitating the dye/clay/polyurethane dispersion sufficient to delaminate all or a portion of said layers from the lamellar clay and from each other; and solution casting and drying the dye/clay/polyurethane dispersion to form a dyed film.

DETAILED DESCRIPTION OF THE INVENTION

Polyurethane of the present invention includes polyurethane elastomers, segmented polyurethane, polyurethaneurea, and the like. Preferably the polyurethane is a segmented polyurethane useful in the manufacture of spandex. As used herein, the term "spandex" is a long chain synthetic fiber comprised of at least 85% by weight of a segmented polyurethane. The segmented polyurethane is composed of "soft segments" and "hard segments". The soft segments can be polyether-based portions of the polymer chain, e.g., are derived from a poly(tetramethyleneether) glycol (PO4G). The hard segments refer to the portions of the polymer chains which are derived from the reaction of an organic diisocyanate, such as methylene-bis-(4-phenylisocyanate) (MDI), with a diamine chain extender.

Polyethers suitable for use in making the glycol soft segment of the spandex polymer of the present invention include but are not limited to those derived from tetramethylene glycol, 3-methyl-1,5-pentane diol, tetrahydrofuran (THF), 3-methyltetrahydrofuran (3-MeTHF), and the like, and copolymers thereof. PO4G usually has a number average molecular weight in the range of 1750 to 2250.

Copolyether glycols of this composition may be prepared according to the general procedures of U.S. Pat. No. 5,000,899 and references therein.

Glycol-terminated polyesters which may be used in conjunction with the present invention include but are not limited to the reaction products of ethylene glycol, tetramethylene glycol, and/or 2,2-dimethyl-1,3-propane diol and the like with diacids such as adipic acid, succinic acid, dodecanedioic acid, and the like. Copolymers are also contemplated.

Also contemplated as soft segments for use in the present invention are polyetheresters comprised of elements of the above polyethers and polyesters, and diol-terminated polycarbonates such as poly(pentane-1,5-carbonate) diol and poly(hexane-1,6-carbonate) diol, and the like.

It is well-known in the art that completion of the formation of the polyurethane may be accomplished with diamines which act as chain extenders, to form polyurethaneureas. Those that may be used with the present invention include ethylene diamine, 1,3-cyclohexane diamine (HMPD), 1,4-cyclohexane diamine (HPPD), 1,3-propylene diamine (1,3-PDA), 2-methylpentamethylene diamine (MPMD), 1,2-propylene diamine (1,2-PDA), 1,2-diaminoethane (EDA) and the like, and mixtures thereof. Chain extension may also be accomplished with diols such as ethylene glycol, tetramethylene glycol, and so on. Chain extension can also be done with diacids, such as adipic acid.

The chemical names of polyurethane may be abbreviated according to their compositions. Monomers of the repeating units of the polymer are separated by colons. For example, a polyurethaneurea made from poly(tetramethyleneether) glycol (PO4G), methylene-bis(4-phenylisocyanate) (MDI) and a mixture of ethylene diamine (EDA) and 2-methyl-1,5-diaminopentane (MPMD) is abbreviated PO4G:MDI:EDA/MPMD. Diamines separated by slashes are in a mixture. Parenthetic numbers immediately following the glycol and diamine mixture respectively, refer to the number average molecular weight of the glycol and the molar ratio of the given diamines. Thus, for example, a polyurethaneurea of the present invention is abbreviated as: PO4G(1800):MDI:EDA/PDA(85/15). A preferred polyurethane of the present invention is PO4G(1800):MDI:EDA/MPMD(90/10).

The reactions used for preparing the polyurethane generally are carried out in an inert solvent, such as dimethylacetamide (DMAc), dimethylformamide, N-methylpyrrolidone or the like.

"Lamellar clay" as used in the present invention is a layered clay having negative charges on its layers and exchangeable cations in the interlayer regions. Besides its cation-exchanging ability, the lamellar clay of the present invention further exhibits the property of being capable of incorporating water, alcohol or similar compounds into the interlayers and expanding. Water and the other polar organic compounds interact with the lamellar clay. The polar organic compounds can be alcohol (primary alcohols like methanol, ethanol and the like and polyhydric alcohols like ethylene glycol, glycerol and the like), ketones, such as acetone and the like, and aliphatic, cyclic and aromatic amines, and the like. Similar compounds can be found in *The Chemistry of Clay-Organic Reactions* by B. H. G. Theng, John Wiley & Sons, New York, 1974. These clays can have a triple-layer structure wherein a magnesium or aluminum octahedral layer is sandwiched between two silica tetrahedral layers. Examples of lamellar clays are smectic clays such as, montmorillonite, saponite, beidellite, nontronite, hectorite, stevensite, bentonite, or substituents, derivatives or a mixture of these substances, and the like. These clays can be either natural or synthetic. Montmorillonite and bentonite are preferred lamellar clays.

Swelling mica is also a useful lamellar clay. Examples of swelling mica are chemically synthesized swelling mica such as SOMASIF (trade name, manufactured by CO-OP Chemical Co., Ltd., Tokyo, Japan) and tetrasilicic mica containing a lithium ion or a sodium ion in the interlayers, taeniolite, or substituents, derivatives or a mixture of these substances.

The lamellar clay should have a cation exchange capacity (CEC) of about 50 to about 200 milliequivalents (meq)/100 g of clay. If the cation exchange capacity is less than 50 meq/100 g of clay, the swelling of the clay layers cannot be sufficiently effected and exchange of cations with modifying compounds, such as organic onium compounds, cannot be done effectively. If the cation exchange capacity exceeds 200 meq/100 g of clay, the lamellar clay will not disperse finely due to higher bond strength between the layers.

Commercially available purified bentonites are available under the trade name Polargel NF (American Colloid Company, Arlington Heights, Ill.) and others can be prepared from a Wyoming source of sodium montmorillonite feed stock (provided by Southern Clay Products Inc., Gonzales, Tex.). Sodium montmorillonite is preferred because organic onium modified clays prepared from this source display good dispersibility in solvents used to prepare wet- and dry-spun polyurethane fibers. These clays have a cation exchange capacity of about 90–100 meq/100 g of clay.

Prior to dispersion or modification of the lamellar clay, it may be necessary to subject the lamellar clay to shear by pulverizing treatment, high speed shear cleavage of a wet type or a dry type, or ultrasonic cleavage.

The interlayer separation in the lamellar clay can vary from about 8 Å to about 12 Å depending on the hydration of the clay. Preferably, the lamellar clay is modified to provide an interlayer distance of the layers of the clay of at least 17 Å. The interlayer separation of the lamellar clay can be measured by x-ray diffraction. These preferred interlayer distances provide for good delamination of the layers from the lamellar clay during modification and/or upon agitation. Good delamination can be exhibited by random distribution of the clay layers, i.e. no order in the layer arrangement, as well as, absence of x-ray peaks in the low 12–50 Å range measured after dispersion of the clay in a polyurethane.

Modification of a lamellar clay can be based on the replacement of exchangeable inorganic ions in the lamellar clay. Alkaline or alkaline earth metal ions and the like in the lamellar clay can be removed by substitution, for example with ions from an organic onium compound by first expanding the clay in water, alcohol or a similar solvent. Since the metal ions have different capacities for exchange reactions, monovalent cations like $Na^+$, $K^+$ and the like are preferred. The ratio (CEC) of the organic onium ions to the layered clay is not specifically restricted; however, the amount of the organic onium ions should be large enough for the substantially complete replacement of the exchangeable inorganic ions of the clay. Preferably, replacement is in an amount of about 0.7 to about 1.25 times (as equivalents).

Organic "onium" compounds can be primary, secondary, tertiary or quaternary ammonium compounds; pyridinium compounds; imidazolinium compounds; phosphonium compounds or sulfonium compounds. Preferred examples of onium ions are N-((tallowalkyl)-bishydroxyethyl) methyl ammonium ion; 1-dodecylammonium ion, and N-((hydrogenated tallowalkyl)-2-ethylhexyl)dimethyl ammonium ion, hexamethyleneimine ammonium, methyl-1-hydrogenated tallow amidoethyl 2-hydrogenated tallow imidazolinium methyl sulfate and salts of dehydroabietylamine. By "tallow" is meant herein the fat from the fatty tissue of bovine cattle or sheep. Tallow contains (as glycerides): oleic acid, palmitic acid, stearic, myristic, and linoleic. Minor constituents of tallow are cholesterol, arachidonic, elaidic, and vaccenic acid. The most observed characteristic of tallow is its solidification point which ranges from 40 to 46 degrees Centigrade. Further, tallow alkyl or hydrogenated tallw alkyl are terms used in commerce generally referring to mixing $C_{16}$ and $C_{18}$ alkyl groups obtained from tallow. The organic onium compounds have an onium ion at one terminal of the main chain and can have one or more long alkyl chains or a bulky non-aromatic cyclic compound to increase the clay interlayer separation upon substitution with metal ions. The main chain can be a straight or branched carbon chain; it can have a ring structure in part thereof. The other terminal of the main chain can have a hydrogen atom or a group (or a derivative thereof) such as a hydroxyl group, amino group, carboxyl group, nitro group, and sulfone group. The main chain should preferably have 6 or more carbon atoms so that the organic onium ion expands the interlayer distance of the lamellar clay to such an extent that the ionic interactions between the layers are reduced. However, the main chain should preferably have less that 20 carbon atoms so that the organic onium ion has a good affinity for an aprotic polar solvent, such as those noted herein.

There is no specific limitation on the method for producing organic onium modified clay so long as the exchangeable cation of the lamellar clay can be efficiently ion exchanged for an organic onium ion. A typical process consists of mixing a lamellar clay with organic onium ions in a neat or mixed solvent selected from water, methanol, ethanol, propanol, isopropanol, ethylene glycol, 1,4-butanediol, and glycerin. A preferred solvent for montmorillonite is water, methanol or ethanol, or a mixture thereof. For example, to a dispersion comprising from 1 to 5% by weight of the lamellar clay in water, a solution of a quaternary ammonium salt in an amount 0.5 to 1.5 times (as equivalents) as much as that of the lamellar clay in terms of cation exchange capacity can be added.

To prepare the fiber or film of the present invention, a lamellar clay, or a dispersion of the lamellar clay in an aprotic polar solvent is contacted with a solution comprising a polyurethane and the same or a different aprotic polar solvent to form a polyurethane/clay dispersion. Preferably, the lamellar clay is modified to provide an interlayer distance between the layers of the clay of at least 17 Å. Modification, for example with organic onium ions, can be accomplished as described above. The lamellar clay in the polyurethane/clay dispersion is in an amount of about 0.1 to about 12% by weight, preferably about 0.5 to about 3% by weight, based on the solid component of the polyurethane. Preferably the same aprotic polar solvent is used for the clay dispersion preparation as is in the solution comprising the polyurethane. Solvents, such as dimethylacetamide (DMAc), dimethylformamide, N-methylpyrrolidone or the like are preferred with DMAc being most preferred. The aprotic polar solvent is a solvent for the polyurethane only, but it is miscible with organic onium ions, if present, and hence with a modified lamellar clay. Therefore, these solvents permit intimate mixing (at the molecular level) of the polyurethane with the lamellar clay. Preferably upon contact with the polyurethane solution, the lamellar clay is expanded with the polyurethane (the polyurethane diffuses into the space between the layers of the lamellar clay) such that the interlayer distance of the lamellar clay is greater than about 25 Å as measured in a dried polyurethane film comprising such clay. Expansion can act to delaminate some of the layers of the clay.

The polyurethane/clay dispersion is agitated with an amount of shear sufficient to further delaminate all or a portion of the layers of clay from the lamellar clay and from each other. This agitation can be applied by high shear mixers, static mixers, such as Koch or Kenix mixers, media mills, sand mills, gear pumps or the like. Preferably, x-ray diffraction analysis of a dried film formed from the polyurethane/clay dispersion shows no residual d(001) peaks and no expanded d(001) peaks. The lack of these peaks indicate delamination with more than 1–2 polyurethane molecules between the layers of the clay. Only broad x-ray scatter is observed supporting polyurethane/clay film or fiber having delaminated and well-dispersed layers.

Following agitation, dispersion of the lamellar clay in the polyurethane is a state of dispersion in which the lamellar clay is delaminated primarily into individual layers at the molecular level. By "delaminated" is meant that the layers of the clay are exfoliated and dispersed in a continuous polymer matrix. The state of dispersion is such that more than 50%, preferably more than 70% of the lamellar clay is dispersed as layers without forming a mass. Most preferably the layers are individual layers or are groups numbering less than 5 layers (on average) orienting parallel to one another or randomly or both in dispersions prior to fiber or film formation. When the polyurethane/clay dispersion is formed into a fiber or a film, the delaminated layers are oriented in a direction parallel to the fiber or the film axis. Transmission Electron Microscopy (TEM) can be used to confirm that the layers of the lamellar clay have delaminated into primarily individual layers (about 10 Å thick×about 2000 Å diameter for montmorillonite) to a fairly high degree and that these layers are highly oriented with film or fiber spinning direction.

The polyurethane/clay dispersion can then be formed into fibers or film. For fibers, the polyurethane/clay dispersion can be wet- or dry-spun into filaments from preferably the same solvent as was used for the polyurethane polymerization reactions. The polyurethane/clay dispersion can be spun as single filaments or can be coalesced by conventional techniques into multi-filament yarns.

Following or during spinning the solvent can be removed from the fibers via conventional methods. Dry spinning of the fiber is preferred.

"Fibers" as used herein, mean filaments, fibers, and/or yarns prepared using polyurethane. Threads of polyurethane of the present invention may be covered or entangled with conventional nonelastic fibers (e.g. of polyamide, such as nylon, or polyester).

In order to form film, the polyurethane/clay dispersion can be solution cast and then dried using conventional techniques. Preferably the solution is cast and dried on a substrate, for example another polymer, such as polyethylene teraphthalate, Mylar® for example; glass, ceramic; or a fabric, such as spandex, or polyester, Dacron for example, cotton, nylon or the like. Coating fabrics with the films of the present invention can impart waterproof characteristics to such fabrics.

In the fibers and films of the present invention, the lamellar clay can be contacted with the polyurethane alone or with other additives in a concentrated slurry which is then incorporated in the fiber polymer solution stream or the film casting solution. Conventional agents can be added for specific purposes, such as antioxidants, thermal stabilizers, UV stabilizers, pigments (for example titanium dioxide and the like), lubricating agents, other anti-tack agents (for example silicone oil, metal stearates, and the like), additives to enhance resistance to chlorine degradation (for example zinc oxide, magnesium oxide, and the like), and the like, as long as such agents do not produce an antagonistic effect with the polymer or the organic onium modified clay of this invention.

Figure 1:
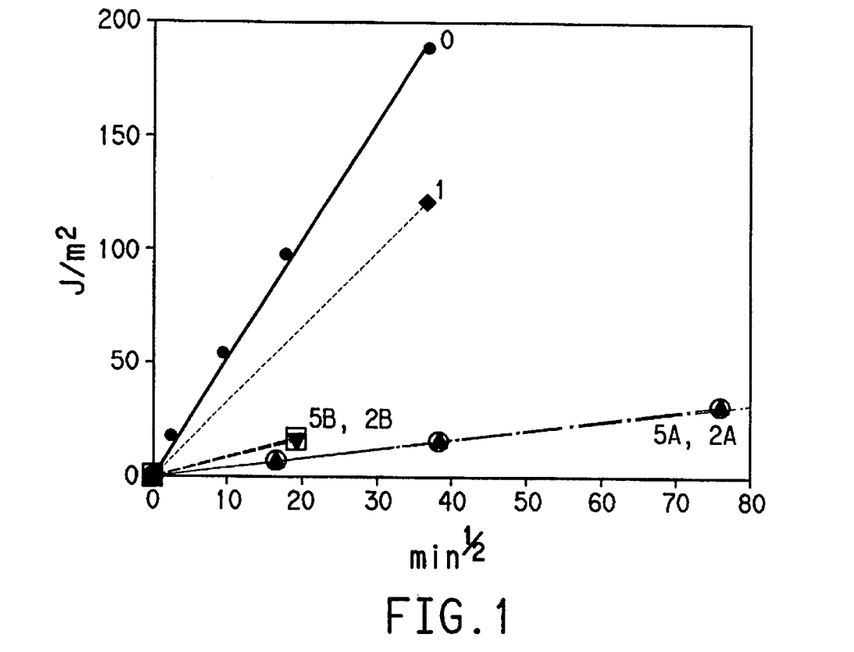
FIG. 1 is a graphical representation from Example 4 of peel force ($J/m^2$) as a function of time for various polyurethane films having modified clay, unmodified clay or no clay dispersed therein showing film to film adhesion growth.

Polyurethane fiber and film of the present invention exhibit a desirable reduction in tackiness or decrease in self adhesion. FIG. 1 is a plot of the work or the peel force ($J/m^2$) to rupture a self adhesion bond of polyurethane film to polyurethane film versus the square root of time ($min^{1/2}$) at room temperature (see Example 4). Films with different and varying amounts of organic onium modified lamellar clay were compared with a film containing no lamellar clay and a film containing unmodified lamellar clay. All films had no added surface lubricant. Sample 0 (solid line with solid circles) was the control and had no clay; Sample 1 (dotted line with diamonds) had unmodified lamellar montmorillonite clay; Sample 2A (solid line with triangles) had 3% N-(tallowalkyl)-bishydroxyethyl)methyl ammonium modified montmorillonite; Sample 2B (dotted line with triangles) had 1% N-(tallowalkyl)-bishydroxyethyl)methyl ammonium modified montmorillonite; Sample 5A (solid line with open circles) had 3% 1-dodecyl ammonium modified montmorillonite; and Sample 5B (dotted line with quartered squares) had 1% 1-dodecyl ammonium modified montmorillonite. The graph illustrates the dramatic effect of organic onium modified lamellar clay on reducing the rate of tack build up. Samples having 1 and 3 wt. % modified lamellar clay (Samples 2B, 5B, 2A and 5A) exhibit a significant reduction in tack growth when compared to the control film (Sample 0). Even the film having unmodified clay (Sample 1) exhibited some tack reduction. On a true time basis, one example of the data reveals that it takes 96 hr aging with 3% modified lamellar clay to reach the tack that the control reached in 30 min. A 1% modified lamellar clay loading is slightly less effective than 3% but still reduces the tack growth by over an order of magnitude.

Figure 2:
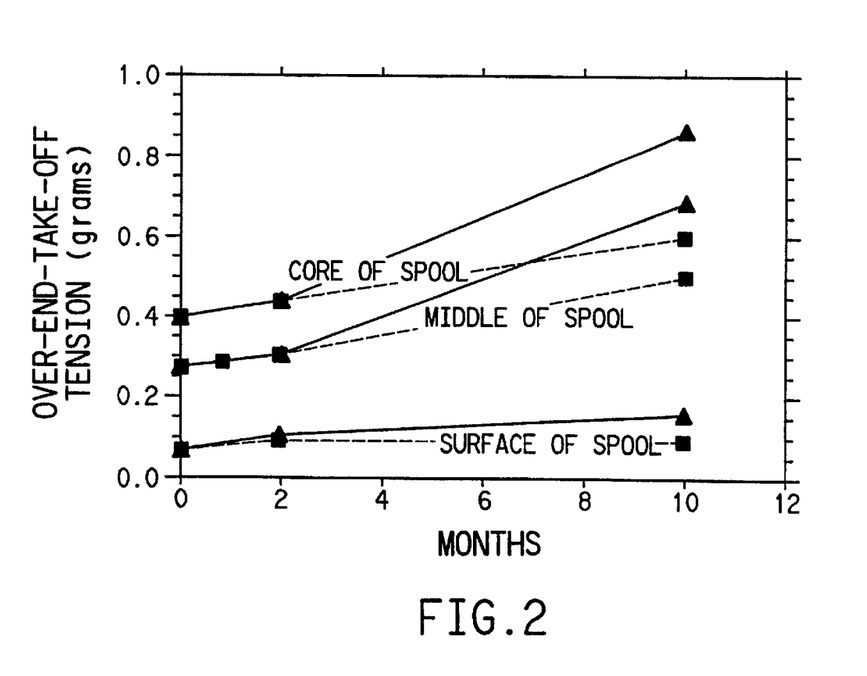
FIG. 2 is a graphical representation of Example 5 showing tack growth of a 15 denier spandex as a function of time for fiber at the core, middle and surface of a spool. One fiber containing 2% organic onium modified lamellar clay (dotted line with a square) was compared with a control, i.e. spandex having no clay, (solid line with triangle). Aging took place at 24° C.

FIG. 2 is a graphical representation showing tack growth as a function of time for fiber at the core, the middle and at the surface of a spool (See Example 5). The graph illustrates that incorporation of the modified clay in the fiber decreases the amount of over-end take-off tension for fiber at the core, middle and surface of the spool over time; the improvement being realized after several months of aging.

Thus, the present invention provides a method for reducing tack in polyurethane fiber or film. The method comprises dispersing a lamellar clay into a polyurethane solution, agitating the solution to delaminate all or a portion of the layers from the clay and from each other, and forming the solution into a fiber or film. For the preparation of a fiber, the solution can be wet- or dry-spun. The ingredients, dispersion, agitation and spinning are as described above. For the preparation of a film, the solution can be cast and dried by conventional methods known to those of skill in the art.

The fiber and film of the present invention retain the desirable properties of polyurethane fiber and film which does not incorporate a lamellar clay, e.g. in modulus, tenacity, elongation, toughness, and the like. (See Example 1)

The fiber and film of the present invention can be uncolored or it can further comprise a dye. By "uncolored" is meant that neither the fiber nor the film nor any of its components has been contacted with a dye. The fiber or film of the present invention exhibits improved uptake and fixation of dyes. By preparing fiber or film using the processes of the present invention, a method for increasing the ability of polyurethane to affix at least one dye is provided.

Dye can be used to offset the natural color of the lamellar clay in fiber. Useful loadings of such dye can range from 100 ppb (0.00001%) to 15% OWF (on weight of fiber).

Organic dyes found to be useful for purposes of the present invention include acid, pre-metallized acid, cationic, disperse, direct and reactive dyes. Representative of acid dyes are: Acid Blue 25, Acid Red 25, Acid Green 23, Acid Red 266, Acid Red 361, Acid Yellow 49, Acid Yellow 198, Acid Black 194 and Nylanthrene Black GLRT. Representative of pre-metallized acid dyes are: Acid Yellow 116, Acid Orange 162, Acid Brown 226, Acid Red 251, Acid Blue 171, Acid Black 131, Acid Black 107 and Acid Black 132. Representative of cationic dyes are: Cationic Blue 77, Cationic Blue 3, Cationic Yellow 53, Cationic Yellow 11, Cationic Red 29, Sevron Blue GBR, Sevron Black JON and Astrazon Black FSW. Representative of disperse dyes are: Disperse Blue 79, Disperse Red 60, Disperse Red 167, Disperse Yellow 23, Disperse Yellow 114, Foron Black EDC and Intrasil Black HFE. Representative of direct dyes are: Direct Yellow 106, Direct Red 89, Direct Blue 98 and Direct Black 22. Representative of reactive dyes are: Reactive Yellow 86, Reactive Red 2, Reactive Blue 4 and Reactive Black 5.

Fibers of the present invention, or fabrics containing the fibers of the present invention, or films of the present invention can be dyed with combinations of more than one dye of the same class or combinations of dyes from different classifications. The dye lists given above are not meant in any way to limit the dyes useful with the present invention. The "Color Index, 3rd Edition, and its Additions and Amendments" provide generic names for classifying commercial dyes and pigments with respect to usage. Where supplied by the vendor C.I. generic names are given above. The cases where C. I. names are not used indicate the vendor has chosen not to identify the C.I. name or that the dye as supplied is a mixture of more than one dye of that class (e.g., many of the black dyes).

An uncolored fiber or an uncolored film can by dyed after formation, the dye can be introduced while in the process of forming the fiber or film, or the fiber or film can be dyed both during and after the process of formation of the fiber or film.

If the fiber or film is dyed after formation of the fiber, the process as described above for preparing the fiber or film-is used and further comprises the step of contacting the fiber with a dye to form a dyed fiber or a dyed film. The fiber can be dyed prior to knitting into a fabric or after knitted into a fabric. Contact of the fiber, or the fabric, or the film with the dye can be by conventional methods known to those skilled in the art.

In another embodiment of the present invention the dye can be introduced while in the process of forming the fiber or film. In this process a polyurethane solution is contacted with a lamellar clay, preferably modified with onium ions, and a dye. Prior to contact with each other, a dye solution or dispersion, a polyurethane solution and a clay dispersion are prepared.

The dye solution or dispersion comprises an organic dye, preferably a water-soluble acid or cationic organic dye, which is dissolved in water, preferably deionized water, alcohol or other solvents such as acetone or acetic acid. If necessary the dye can be dissolved in the solvent below the boiling point of the solvent. Suitable acid or cationic dyes are described above. Heating the water to an elevated temperature, e.g., 40° C. to 90° C. can also be done in order to dissolve the dye. However, many dyes are also soluble in cold water so that use of the heated water is an optional feature depending on the dye used. The acid dyes should have an amine or other functionality that can be converted to the salt structure upon treatment with mineral or organic acids. It is preferred that the dyes have good solubility in solvents like water or alcohol that expand the lamellar clay.

Preferably, the dye solution or dispersion further comprises an organic onium compound, as described above.

The clay dispersion is prepared by dispersing a lamellar clay in a solvent such as water, preferably deionized water, alcohol or a similar compound such as acetone or acetic acid. Preferably, the clay is dispersed in the same solvent as used in the dye solution.

The clay dispersion is then contacted with the dye solution or dye dispersion, preferably with stirring, to form a first dye/clay dispersion. As a result of this contact, the dye becomes ionically associated with the clay. Preferably, the dyes and any organic onium ions present used to exchange cations are always used on an equal molar basis or slightly less than equal molar basis so that the lamellar clay has an interlayer separation of 20 Å or more. The dye and any onium compound used for exchange reactions can be substituted on the cation exchange basis from 50/50 to 1/99 range. The selected range depends on the color strength of the dyes needed for coloring the fiber. There is no specific limitation on the method for producing the first dye/clay dispersion wherein the dye solution further comprises the organic onium ions so long as the exchangeable cation of the clay can be efficiently ion exchanged for the organic onium ions thus forming an organic onium modified lamellar clay having a dye ionically associated therewith. A typical process consists of mixing the lamellar clay with the dye solution in a neat or mixed solvent selected from water, methanol, ethanol, propanol, isopropanol, ethylene glycol, 1,4-butanediol, and glycerin. A preferred solvent for montmorillonite is water, methanol or ethanol, or a mixture thereof. For example, to a dispersion containing from about 1 to about 5% by weight of the lamellar clay in water, a dye solution having a quaternary ammonium salt therein in an amount 0.5 to 1.0 times (as equivalents) as much as that of the lamellar clay in terms of cation exchange capacity can be added.

Alternatively, a dye solution without the organic onium compound can be added to the clay dispersion first followed by contact with an onium salt solution provided that the amount of dye solution (on an exchange basis) is low and the clay does not flocculate after the addition of the dye solution. The treatment with onium salt solution is done later to flocculate the clay (pigment).

Next, a dyed clay is recovered, preferably as a solid, from the first dye/clay dispersion by filtering, washing, heating or some combination thereof.

After the dyed clay is recovered, it is dispersed in an aprotic polar solvent miscible with any organic onium ion present and hence with the modified lamellar clay to form a second dye/clay dispersion. The solvent can be the same or a different solvent from the solvent used to dissolve the polyurethane described below. Solvents, such as dimethylacetamide (DMAc), dimethylformamide, N-methylpyrrolidone or the like are preferred with DMAc being most preferred.

To form the polyurethane solution, the polyurethane is dissolved in the same or a different aprotic polar solvent, as described above, preferably the same solvent as used in the preparation of the second dye/clay dispersion, most preferably, DMAc, to form the polyurethane solution. Alternatively, the polyurethane can already be in solution form as a result of its polymerization conditions.

The polyurethane solution is next contacted with the second dye/clay dispersion to form a dye/clay/polyurethane dispersion. The aprotic polar solvent(s) used in both the polyurethane solution and the second dye/clay dispersion permit intimate mixing (at the molecular level) of the polyurethane with the dyed organic onium modified lamellar clay. Preferably upon contact, the distance between the layers of the dyed clay are expanded with the polyurethane such that the interlayer distance of the dyed clay is greater than about 25 Å.

The dye/clay/polyurethane dispersion is agitated with an amount of shear sufficient to further delaminate all or a portion of the layers from the lamellar clay and from each other. This agitation can be applied by high shear mixers, media mills, sand mills, gear pumps or the like. Preferably, x-ray diffraction analysis of a dried film formed from such a dispersion shows no residual d(001) peaks and no expanded d(001) peaks. The lack of these peaks indicate delamination with more than 1–2 polyurethane molecules between the layers of the clay. Only broad x-ray scatter is observed supporting a dye/clay/polyurethane dispersion having delaminated and well-dispersed layers.

Following agitation dispersion of the dyed organic onium modified lamellar clay in the polyurethane is a state of dispersion in which the dyed organic onium modified lamellar clay is divided primarily into individual layers at the molecular level. The state of dispersion is such that more than 50%, preferably more than 70% of the dyed organic onium modified lamellar clay is dispersed without forming a mass. Most preferably the layers are individual layers or are groups of less than 5 layers (on average) orienting parallel to one another or randomly or both. When the dye/clay/polyurethane dispersion is formed into a film or a fiber, these individual layers delaminated from the dyed organic onium modified lamellar clay are oriented in a direction parallel to the film or fiber axis. TEM can be used to confirm that the layers of the lamellar clay have delaminated into individual layers to a fairly high degree (about 10 Å thick×about 2000 Å diameter for montmorillonite) and that these layers are highly oriented with the film or with the fiber spinning direction.

Finally, the dyed/clay/polyurethane dispersion is spun into fibers or dried as a film. The dye/clay/polyurethane dispersion can be wet- or dry-spun into fibers from the same solvent as was used for the polyurethane polymerization reactions. The dye/clay/polyurethane dispersion can be spun as single fibers or can be coalesced by conventional techniques into multi-filament yarns. Following or during spinning the solvent is removed from the fibers via conventional methods. Dry-spinning is preferred.

Another benefit of dyeing in the manner described immediately above is that it can be used to offset the natural color of the lamellar clay. For example, a small amount of blue dye can offset any yellowness of the fibers.

Dye can be introduced while in the process of forming the fiber or film, as described above, and a second dye can be applied after fiber or film formation. Thus, the process of the present invention immediately above can further comprise contacting the fiber spun or film cast from the dye/clay/polyurethane dispersion with a second dye. The spun fiber can be dyed prior to knitting into a fabric or after knitting into a fabric. Dyeing can be by conventional means known to those of skill in the art.

Yarn and fabric made of the fiber of the present invention and film of the present invention exhibit increased color uptake (up to 50% more dye uptake with acid dyes) and washfastness. The increased dye uptake and washfastness leads to decreased "grin-through" when fibers are used in blend fabrics, e.g. in fabrics containing, for example, polyamide or polyester fibers in addition to the polyurethane fibers.

The fiber and film of the present invention retain the desirable properties of polyurethane which does not incorporate an organic onium modified lamellar clay, e.g. modulus, tenacity, elongation, toughness, and the like are maintained.

EXAMPLES

Polyurethane referred to in the following examples (unless otherwise noted) is a polyurethaneurea made from poly(tetramethyleneether)glycol (PO4G), methylene-bis(4-phenylisocyanate)(MDI) and a mixture of ethylene diamine (EDA) and 2-methyl-1,5-diaminopentane (MPMD) and is available from E. I. du Pont de Nemours and Company, Wilmington, Del. The number average molecular weight of PO4G was about 1800, the capping ratio (the molar ratio of MDI to PO4G) was 1.7, and the molar ratio of EDA to MPMD was 90/10. The NCO content of the isocyanate-capped polyether was about 2.4%. The NCO content can be measured by the method of S Siggia, "Quantitative Organic Analysis via Functional Group", Third Edition, Wiley and Sons, New York, pp. 559–561 (1963).

The following organic onium modified lamellar clays used in the examples were either prepared as described below or purchased from the indicated sources. Clay powders were dried overnight in a vacuum oven at 80° C. 6% solids dispersion were made with DMAc solvent using a homogenizer mixer (2.6 g clay plus 40 g DMAc).

| Sample No | Montmorillonite Clay Designation |
|---|---|
| 1 | "Polargel" NF: unmodified sodium montmorillonite (American Clay Company, Arlington Heights, IL) |
| 2 | (N-(tallowalkyl)-bishydroxyethyl)methyl ammonium modified montmorillonite (Southern Clay Products, Inc., Gonzales, TX) |
| 3 | "Claytone 40" dimethyl di-hydrogenated tallow ammonium modified montmorillonite (Southern Clay) |
| 4 | methyl-1-hydrogenated tallow amidoethyl 2-hydrogenated tallow imidazolinium methyl sulfate modified montmorillonite (Imidazolinium ion source is Varisoft ® 445 from Witco Chemical Co.) |
| 5 | 1-dodecylammonium modified montmorillonite |
| 6 | N-((hydrogenated tallowalkyl)-2-ethylhexyl) dimethyl ammonium modified montmorillonite (Southern Clay) |
| 7 | hexamethyleneimine ammonium modified montmorillonite |
| 8 | dehydroabietylamine modified montmorillonite |

Preparation of Sample 4

A 5% water dispersion of "Polargel" NF (sodium montmorillonite) was prepared by dispersing 50 g of "Polargel" NF in 1000 g of deionized water using a high-speed homogenizer mixer. To that mixture was added a solution of 55 g of "Varisoft" 445 (from Sherex division of Witco Chemicals) which is a 75% solids quaternary ammonium salt containing 25% isopropanol. "Varisoft" 445 is 1-methyl-hydrogentated tallow amidoethyl 2-hydrogentated tallow imidazolinium methylsulfate. "Varisoft" 445 had been dissolved in an additional 200 ml of isopropanol before adding to the clay dispersion. The organic onium modified clay flocculated and precipitated immediately when the ammonium salt solution was added. This slurry was stirred and temperature raised to 80° C. for one hour. The organic onium modified clay was isolated by filtration, reslurried twice in 1 liter of water and reisolated by filtration. The solids were dried, granulated and then "air-micronized" to a particle size of <3 microns.

Preparation of Sample 5

A 5% water dispersion of "Polargel" NF (sodium montmorillonite) was prepared by dispersing 50 g of "Polargel" NF in 1000 g of deionized water using a high-speed homogenizer mixer. To that mixture was added a solution of 55.5 g of 1-dodecylamine which had been dissolved in 500 ml of water and neutralized with 30 g of 37% hydrochloric acid solution. The organic onium modified clay flocculated and precipitated immediately when the ammonium salt solution was added. This slurry was stirred and temperature raised to 80° C. for one hour. The organic onium modified clay was isolated by filtration, reslurried twice in 1 liter of water and reisolated by filtration. The solids were dried, granulated and then "air-micronized" to a particle size of <3 microns.

Preparation of Sample 7

A 5% water dispersion of "Polargel" NF (sodium montmorillonite) was prepared by dispersing 50 g of "Polargel" NF in 1000 g of deionized water using a high-speed homogenizer mixer. To that mixture was added a solution of 25.8 g of hexamethyleneimine dissolved in 400 ml of water and neutralized with 30 g of 37% hydrochloric acid solution. The organic onium modified clay flocculated and precipitated immediately when the ammonium salt solution was added. This slurry was stirred and temperature raised to 80° C. for one hour. The organic onium modified clay was isolated by filtration, reslurried twice in 1 liter of water and reisolated by filtration. The solids were dried, granulated and then "air-micronized" to a particle size of <3 microns.

Preparation of Sample 8

169.4 g of sodium montmorillonite clay (provided by Southern Clay Products, Inc., as a 3.08% solid dispersion in water with a cation exchange capacity of 90 meq/100 g) was heated to 70° C. 43.52 g of dehydroabietylamine was acidified with 25 ml of acetic acid and the salt was dissolved in 500 ml of deionized water. The amine salt solution was added to the clay dispersion under vigorous stirring conditions. The flocculated clay dispersion was stirred for another hour at 70° C. The clay was filtered, washed twice by suspending in deionized water, stirred and heated to 70° C. and filtered. The clay was dried at 110° C. under vacuum. It was then air micronized to less than 10 micron particles sizes and dispersed in DMAc at 5 wt % solid concentration using a Silverson Homogenizer.

EXAMPLE 1

Fiber Tensile Test and Fiber Cyclic Test 300%

Fiber comprising onium modified montmorillonite was prepared by combining a 36% polyurethane solution in DMAc with an 8% DMAc dispersion of montmorillonite clay modified with (N-tallowalkyl)-(bishydroxyethyl) methyl ammonium at proportions to provide dried polymer containing 1 wt % and 2 wt % of the clay additive. The 8% modified clay in DMAc dispersion was prepared by high shear mixing with a homogenizer mixer. The mixture of this dispersion with the polyurethane solution was prepared with low shear paddle mixing followed by circulation of this mix through a gear pump for 2–4 hours.

The solutions described above, plus a separate control solution containing no clay additive, was dry spun into 15 dtex yarns in a conventional apparatus. The solution was metered through spinneret orifices into a spin shaft in which the solution formed filaments as the DMAc solvent evaporated. A flow of heated nitrogen gas was supplied to the shaft to evaporate the DMAc. The threadlines exited through the bottom of the shaft. A silicone oil finish lubricant was applied to the threadlines by a kiss roll applicator to provide an addition of about 3.5% based on weight of threadline. The yarn was then wound up at a speed of about 840 meters per minute.

Physical properties of the 15 dtex polyurethane yarns produced by the procedures described above and containing 1 and 2% onium modified montmorillonite, in accordance with the invention, were compared with a control yarn containing no montmorillonite. Tables 1 and 2 summarize the data. Strength and elastic properties of the polyurethane were measured in accordance with the general method of ASTM D 2731-72. Fiber Tensile test data was reported in GPD (grams per denier), Elongation @Max (or break) and Toughness (GPD). For the zero-to 300% elongation cycle test, three filaments 2 inch (5 cm) gauge length were used. The fibers were cycled five times at a constant elongation rate of 800% per minute and then held at the 300% extension for half a minute after the fifth extension. "Unload power" is reported herein in deciNewtons/tex (DN/TEX) and is the stress measured at a given extension during the fifth unload cycle. Percent set was measured on samples that had been subjected to five 0–300% elongation-and-relaxation cycles. The percent set (% S) was then calculated as % S=100($L_f$−$L_O$)/$L_O$, where $L_O$ and $L_f$ are respectively the filament length, when held straight without tension, before and after the fifth elongation/relaxation cycles.

TABLE 1

| % Clay | Initial Modulus GPD | Break Tenacity GPD | Elongation @ Max (%) | Toughness GPD |
|---|---|---|---|---|
| 0% | 0.082 | 1.184 | 429 | 1.460 |
| 1% | 0.071 | 1.224 | 463 | 1.581 |
| 2% | 0.104 | 1.373 | 484 | 1.918 |

TABLE 2

| % Clay | Unload @ 200% dn/tex | Unload @ 167% #1000 | Unload @ 100% dn/tex | Unload @ 60% #1000 | Unload @ 33% dn/tex | % Stress % Stress Decay | % Set |
|---|---|---|---|---|---|---|---|
| 0% | 74.5 | 53.5 | 30.9 | 16.4 | 5.4 | 25.1 | 15.6 |
| 1% | 67.3 | 47.7 | 26.9 | 13.3 | 3.3 | 25.7 | 17.8 |
| 2% | 71.8 | 50.8 | 27.6 | 12.1 | 1.6 | 26.2 | 18.6 |

EXAMPLE 2

Different Wt % Clay Samples

The physical properties of solution cast (and dried) polyurethane samples comprising 0, 1, 3, 5, and 12 wt % dodecylammonium montmorillonite were measured using standard elastomeric conditions. Solution cast and dried films (3–7 mil thick) showed that good elastomeric properties were maintained for all samples. The increase in tensile modulus, yield modulus and modulus at 10% elongation demonstrated a reinforcing property of these clays in thick films. Data below in Table 3 was obtained by ASTM Method D-882. (kpsi=1000×pounds per square inch)

TABLE 3

| % Clay | Tensile Modulus (kpsi) | Yield (kpsi) | Mx. (kpsi) | Break (kpsi) | 10% E Modulus (kpsi) | Elong. @ yield % | Ultimate Elongation % |
|---|---|---|---|---|---|---|---|
| 0 | 0.742 | 0.375 | 5.270 | 5.050 | 0.139 | 44.1 | 860 |
| 1 | 0.800 | 0.391 | 5.250 | 5.020 | 0.154 | 41.5 | 858 |
| 3 | 1.130 | 0.450 | 5.101 | 5.000 | 0.189 | 40.4 | 858 |
| 5 | 1.754 | 0.465 | 3.980 | 3.720 | 0.216 | 34.8 | 764 |
| 12 | 3.082 | 0.511 | 4.880 | 4.870 | 0.336 | 21.1 | 949 |

EXAMPLE 3

Hand Peel Test for Tack Reduction of Film 30 g of polyurethane solution (17.5% solids in DMAc) was separately mixed with a DMAc dispersion containing 2.7 g of Samples 1–7 of the clay listed above (prior to Example 1) using a homogenizer and mixing at moderate speed for 5 min. The calculated clay content on a dry polymer basis was 3% by wt. Sample 0 was a control with no clay added. Films were made by draw knife casting (6–10 mil) onto 5 mil Mylar® polyethylene terephthalate film. Films were dried 30 min in 60° C. air circulating oven and then overnight at 80° C. in a vacuum oven (20" vacuum).

Film strips of the Mylar®/polyurethane laminate were cut and placed polyurethane face to face overnight under the pressure of a two pound weight. Hand-held peels as shown in Table 4 gave the following ratings (0–10) with 10 being the most adhered, 0 being no significant bond.

TABLE 4

| Sample | Peel Rating |
|---|---|
| 0-control | 10 (some separation from the Mylar ® film) |
| 1 | 8 |
| 2 | 3 |
| 3 | 4 |
| 4 | 5 |
| 5 | 3 |
| 6 | 4 |
| 7 | 9 |

EXAMPLE 4

Reduction in Tack in Film

Segmented polyurethane polymer solutions in dimethylacetamide (DMAc) at a 7% concentration (with and without additives) were cast onto Mylar® polyethylene terephthalate flexible film and onto a glass surface and dried to leave a film of approximately 3 μm thick. For improved adhesion to the substrates, corona treated Mylar® and glass treated with aminopropylsilane were used. Sample 0 (the control) is polyurethane having no clay dispersed therein. Sample 1 is polyurethane having unmodified sodium montmorillonite dispersed therein. The other samples are polyurethane having modified montmorillonite dispersed therein. The other samples are: polyurethane having 1-dodecylammonium modified clay dispersed therein (Sample 5A is 3% clay and Sample 5B is 1% clay) and polyurethane having [N-(tallowalkyl)-bishydroxyethyl)methyl ammonium] dispersed therein (Sample 2A is 3% clay and Sample 2B is 1% clay). All modified and unmodified samples dispersed well in DMAc and in the polyurethane with the clay remaining dispersed in the solution and not settling to the bottom with time. Measurements of the 90° peel force were obtained on strips 2 cm wide and 10 cm long on an Instron tensile tester at a rate of 0.3 mm/s. These tests were performed after various annealing times aging at 24° C. The work of detachment per unit area of interface (W) was calculated from the peel force (P) measured at a peel angle of 90° C. $W=P(1-\cos\theta)/w$, for $\theta=90°$, $W=P/w$. The values obtained for W were found to have a pronounced nonlinear time dependence, with approximate power law behavior (tn) and data are plotted versus square root of time. Table 5 presents the peel force data (J/m$^2$) as a function of the square root of time of each of the samples. (See also FIG. 1)

A related test method and description of an expected linear growth of peel force with $t^{1/2}$ is discussed in W. F. Reichert and H. R. Brown, Polymer, 34, 2289 (1993). Further discussion of a method of measuring self-adhesion of spandex polymer as a film is found in J. G. Van Alsten, et al. Macromolecules, 1995, 28, 7019 and in B. B. Sauer, C. R. Gochananour, and J. G. Van Alsten, ACS PMSE Preprints, 8/96 National ACS Meeting, Orlando, Fla.

TABLE 5

| Peel Force (J/m$^2$) | Time (min)$^{1/2}$ Sample Number | | | | | |
|---|---|---|---|---|---|---|
| | 0 | 5A | 2A | 5B | 2B | ! |
| 17.700 | 3.1620 | | | | | |
| *0.0000 | 0.0000 | 0.0000 | 0.0000 | 0.0000 | 0.0000 | 0.0000 |
| 14.700 | 5.4470 | | | | | |
| 53.900 | 9.4870 | | | | | |
| 186.20 | 36.332 | | | | | |
| 98.000 | 18.200 | | | | | |
| 5.8800 | | 17.321 | | | | |
| 14.700 | | 37.947 | | | | |
| 24.500 | | 75.395 | | | | |
| 7.3500 | | 17.321 | 17.321 | | | |
| 17.150 | | 37.947 | 37.947 | | | |
| 29.400 | | 75.895 | 75.895 | | | |
| 18.000 | | | | 18.000 | | |
| 14.500 | | | | 18.200 | 18.200 | |
| 123.00 | | | | | | 37.947 |

*Time zero is taken in the plot as having zero peel force to separate film.

EXAMPLE 5

Reduction in Tack in Fiber 15 denier polyurethane fiber comprising 2% (N-(tallowalkyl)bis hydroxyethyl) methyl ammonium modified montmorillonite clay was spun from a DMAc solution and the fiber surface treated with conventional silicone lubricants before winding and storing on a spool. Wound samples were then aged and were compared with a control using the over-end take-off method described below after ambient temperature aging. Over-end take-off tension, a measure of the tackiness of a spandex yarn, was determined herein in accordance with the procedure disclosed in Hanzel et al., U.S. Pat. No. 4,296,174, Col. 4, lines 20–45, with reference to FIG. 6 of the patent. In accordance with this technique, measurement was made of the average tension required to remove a 183-meter sample of spandex yarn from a supply package of the yarn at a delivery rate of 45.7 meters per minute. The fiber near the core of the spool sees the most pressure and thus builds tack faster than the outside. If too high tack is reached the fiber stretches during spinning and distorts the fiber and/or breaks the fiber. It is felt that a take-off tension of >1 g would give knitting and handling problems in removing fiber from the spool.

Data showed that clay additive reduced the increase of tack over time; the improvement being realized after several months of aging. This indicated extended shelf stability. (See also FIG. 2.)

TABLE 6

| Time (mos.) @ ambient temp. Aging | Take-off Tension (in grams) | | | | | |
|---|---|---|---|---|---|---|
| | Core Control | Core Sample | Middle Control | Middle Sample | Surface Control | Surface Sample |
| 0 | .40 | .40 | 0.28 | 0.28 | 0.07 | 0.07 |
| 2 | .44 | .44 | 0.30 | 0.30 | 0.11 | 0.11 |
| 10 | .86 | .60 | 0.68 | 0.50 | 0.18 | 0.09 |

EXAMPLE 6

Cationic Dyeability of Polyurethane Films Containing 1% Clay

Polyurethane films were prepared by placing 5.0 grams of 12 wt % polyurethane in a DMAc solution into circular aluminum pans. The polyurethane/DMAc solution in pans were placed in an oven at 100° C. under 2" Hg vacuum with a slight nitrogen purge overnight to form the films. The films were then removed from the aluminum pans for subsequent testing. The control films were prepared as stated above. Polyurethane films containing 1% by weight of (N-(tallowalkyl)-bishydroxyethyl)methyl ammonium modified montmorillonite clay were prepared by first mixing the clay in DMAc and then adding the clay/DMAc to make the 12% polyurethane/DMAc solution. Mixing was done in a Waring blender. The polyurethane/clay films were then prepared as stated above.

The polyurethane and polyurethane/clay films were sewn inside cationically dyeable polyester fabric pockets. The ratio of polyurethane film to polyester fabric was 10:90 by weight. The polyurethane/polyester samples were prescoured at a 40:1 liquor ratio by placing in an aqueous solution of 1 g/l Merpol LFH and 0.5 g/l tetrasodiumpyrophosphate at 110° F., heating to 180° F. at a rate of 30° F./min, running for 30 minutes at 180° F., cooling to 170° F., and rinsed until clear with room temperature water.

The polyurethane/polyester samples were cationically dyed using 6.0% on weight fabric (o.w.f.) Sevron Blue GBR or Sevron Yellow R (Crompton & Knowles) at a 40:1 liquor ratio. The aqueous dyebath was set at 80° F. with 3.0 g/l sodium sulfate and acetic acid added to adjust the pH to 4.5. The cationic dye was dissolved in the dyebath, the sample added, and the temperature raised to 239° F. at a rate of 30° F. min, and dyed for 1 hour The dye bath was then cooled to 170° F., rinsed with water until clear and drained.

The dyed samples were placed in an aqueous bath at 110° F. containing 1.0 g/l Merpol LFH and 2.5 g/l acetic acid, heated to 160° F. at a rate of 30° F./min, run for 20 minutes, rinsed clear and drained. The samples were then air dried.

A Multifiber Strip #30 was sewn to each of the polyurethane/polyester samples and the samples subjected at an AATCC 2A Washfastness test. Staining of the multifiber strip was minimal with 4 or 5 ratings in all cases.

Test: 2A Washfastness (Staining)

Pieces of the fabrics were given a standard wash stain test (American Association of Textile Chemists and Colorists Test Method 61-1989, "Color fastness to Laundering, Home and Commercial; Accelerated"; 2A version), which is intended to simulate five washes at low-to-moderate temperatures. The test was run in the presence of a nylon was visually rated. In the ratings, 1 and 2 are poor, 3 is fair, 4 is good, and 5 is excellent.

The polyurethane films were then removed from the polyester pockets and their color measured. Color measurements were done using a Macbeth Color Eye 2020 with Optimatch Software. The Colorant Strength results obtained were:

Standard a) no clay, Sevron Blue GBR
Trial a) 1% clay, Sevron Blue GBR
   CHROMATIC—2815% of Standard at 660 nm
   APPARENT—2387% of Standard
Standard b) no clay, Sevron Yellow R
Trial b) 1% clay, Sevron Yellow R
   CHROMATIC—236% of Standard at 420 nm
   APPARENT—327% of Standard The polyurethane films comprising clay dyed to 23–28× deeper blue and 2–3× deeper yellow than the polyurethane films without the clay. Additionally, the polyurethane film without clay was nearly completely cleared of the Sevron Blue GBR.

EXAMPLE 7

"Grin Through" and Glitter Reduction in Dyed Fabrics with Polyurethane Containing Clay Circular knit Lawson tubing fabrics were knit composed of 85% by weight cationically dyeable polyester (70–34 textured yarn) and 15% by weight of polyurethane, 40d or 15% by weight of polyurethane yarn containing 2% by weight of (N-(tallowalkyl)-bishydroxyethyl)methyl ammonium modified montmorillonite clay.

The two fabrics were cationically dyed using the same procedures and 2A washed as in Example 6; however, liquor ratios of 20:1 and 6.0 % o.w.f. dye were used in this example. The cationic dyes used were: i) Sevron Blue GBR, ii) Sevron Yellow 8GMF, iii) Basacryl Red GL and iv) Sevron Black JON.

In all cases, the fabrics containing the polyurethane yarn when stretched exposed the undyed or lightly stained polyurethane yarn (i.e., "grin through"). The undyed polyurethane yarn also reflects visible light causing the glitter effect. Both "grin through" and glitter are objectionable in most dyed fabrics. This effect is most noticeable in the blue, black and red fabrics, but rather difficult to see in the bright yellow fabric.

The fabrics with the polyurethane yarn containing the 2% clay resulted in the polyurethane yams being dyed. Consequently, the dyed fabrics when stretched did not "grin through" undyed or lightly stained polyurethane yarn. Additionally, the polyurethane yarn being dyed noticeably reduced the amount of reflected light, i.e. reduced the glitter. The Sevron Black JON is a combination dye composed of a number of individual cationic dyed shades (usually blue, red and yellow shades). The polyurethane with clay when dyed with this black dyed to a red brown shade (meaning the blue shade of the combination black did not go into the polyurethane). While a union dye (both fibers dyed to the same shade) did not result for this black, both "grin through" and glitter were reduced greatly.

EXAMPLE 8

100 g of sodium montmorrillonite clay (provided by Southern Clay Products, Inc. as a dispersion in water with a cation exchange capacity of 90 meq/100 g) was dispersed in deionized water. Deionized water was added to the dispersion to make it 3 weight percent clay concentration. The dispersion was heated to 70° C. 20.55 g of dehydroabietylamine was acidified with 15 ml of glacial acetic acid, and the salt was dissolved in 500 ml of deionized water. 6.59 g of Nile Blue dye was dissolved in 300 ml of water. The amine salt and dye solutions were mixed and added to the clay dispersion under vigorous stirring conditions. The flocculated clay dispersion was stirred for another hour at 70° C. The clay was filtered and washed twice by suspending in deionized water, stirring and heating to 70° C. and filtering. The blue pigment was dried at 110° C. under vacuum. The pigment was air micronized to less than 10 micron particle sizes and dispersed in DMAc at 5 wt % concentration using Silverson Homogenizer. The clay pigment prepared under these conditions has an interlayer separation of 22 Å and has about 5.2% Nile Blue dye attached to the clay on weight basis.

EXAMPLE 9

Addition of an organic onium modified clay to a polyurethane can sometimes impart a yellow color to the composition relative to the polyurethane without the organic onium modified clay. Surprisingly small amounts of predyed clay when added to the organic onium modified clay/polyurethane composition largely offsets the yellowness due to the presence of the organic onium modified clay as shown below.

The organic onium modified clays used in this example are Wyoming clays with surface treatments of: A—dehydroabietylamine (ca. 20.4% by weight of the organic onium modified clay) and B—N-(tallowalkyl)-bishydroxyethyl)methyl ammonium and C—dehydroabietylamine and Nile Blue (an organic onium modified clay dye content of 5.2%).

A polyurethane solution and clays modified with A, B, and C were mixed and made into films via the procedure given in Example 6. Yellowness Indices (Y.I.) according to ASTM 1925 were measured using a Hunter Lab ColorQUEST calorimeter operated in the transmittance mode, using the Hunter Lab scale and a 10 degree observer. The polyurethane/organic onium modified clay compositions and their respective Y.I. values are given in Table 7 below.

TABLE 7

| Sample A Weight % | Sample B Weight B | Sample C Parts Per Million | Y.I. |
|---|---|---|---|
| 0 | 0 | 0 | 1.02 |
| 1.0 | 0 | 0 | 2.84 |
| 2.0 | 0 | 0 | 4.17 |
| 3.0 | 0 | 0 | 4.21 |
| 5.0 | 0 | 0 | 6.04 |
| 0 | 1.0 | 0 | 2.57 |
| 0 | 2.0 | 0 | 2.93 |
| 0 | 3.0 | 0 | 3.89 |
| 0 | 5.0 | 0 | 6.20 |
| 0 | 0 | 50 | 1.94 |
| 0 | 0 | 100 | 1.70 |
| 0 | 0 | 500 | 0.61 |
| 1.0 | 0 | 10 | 0.95 |
| 1.0 | 0 | 25 | 0.26 |
| 1.0 | 0 | 50 | 0.12 |
| 2.0 | 0 | 10 | 1.42 |
| 2.0 | 0 | 25 | 0.70 |
| 2.0 | 0 | 50 | 0.86 |
| 3.0 | 0 | 10 | 1.22 |

TABLE 7-continued

| Sample A Weight % | Sample B Weight B | Sample C Parts Per Million | Y.I. |
|---|---|---|---|
| 3.0 | 0 | 25 | 2.12 |
| 3.0 | 0 | 50 | 1.61 |
| 5.0 | 0 | 10 | 2.26 |
| 5.0 | 0 | 25 | 2.50 |
| 5.0 | 0 | 50 | 2.16 |
| 0 | 1.0 | 10 | 1.36 |
| 0 | 1.0 | 25 | 0.72 |
| 0 | 1.0 | 50 | 1.46 |
| 0 | 2.0 | 10 | 2.16 |
| 0 | 2.0 | 25 | 1.35 |
| 0 | 2.0 | 50 | 0.80 |
| 0 | 3.0 | 10 | 2.35 |
| 0 | 0 | 25 | 2.51 |
| 0 | 3.0 | 50 | 0.98 |
| 0 | 5.0 | 10 | 3.24 |
| 0 | 5.0 | 25 | 4.54 |
| 0 | 5.0 | 50 | 3.72 |

As shown by the above data, the addition of component C (pre-dyed organic onium modified clay) in very low amounts to the polyurethane/organic onium modified clay composition significantly lowers the yellowness of the composition.

What is claimed is:

1. A fiber, comprising:

a polyurethaneurea and layers delaminated from a lamellar clay, said layers being dispersed in said polyurethaneurea.

2. The fiber of claim 1 further comprising a dye.

3. The fiber of claim 2 wherein the dye is selected from the group consisting of: acid dye, premetallized dye, cationic dye, direct dye, disperse dye, and reactive dye.

4. The fiber of claim 1 wherein the fiber is uncolored.

5. The fiber of claim 1 wherein the polyurethaneurea comprises 85% by weight of a segmented polyurethane.

6. The fiber of claim 1 wherein the lamellar clay is at least one selected from the group consisting of: smectite clays comprising montmorillonite, saponite, beidellite, nontronite, hectorite, stevensite, bentonite; and swellable mica.

7. The fiber of claim 6 wherein the lamellar clay has a cation exchange capacity of about 50 to about 200 meq/100 g.

8. The fiber of claim 1 wherein the lamellar clay is modified to provide an interlayer distance of said layers of at least 17 Å.

9. The fiber of claim 8 wherein the lamellar clay is modified with an organic onium ion.

10. The fiber of claim 9 wherein the organic onium ion is at least one selected from the group consisting of: a primary ammonium ion, a secondary ammonium ion, a tertiary ammonium ion, a quaternary ammonium ion, a pyridinium ion, an imidazolinium ion, a phosphonium ion and a sulphonium ion.

11. The fiber of claim 1 wherein the layers are individual layers or are groups numbering less than five layers on average.

12. The fiber of claim 1 wherein the modified clay and the polyurethaneurea are mixed in a ratio of about 0.1 to about 12 parts by weight for the clay to about 88 to about 99.9 parts by weight for the polyurethaneurea.

* * * * *